United States Patent [19]
Chen et al.

[11] Patent Number: 5,659,533
[45] Date of Patent: Aug. 19, 1997

[54] METHOD OF USING A SINGLE PICK-UP HEAD TO READ AND STORE DATA ON DISCS OF DIFFERENT THICKNESSES AND STRUCTURE OF A PICK-UP HEAD APPARATUS THEREFOR

[75] Inventors: Tzu-Kan Chen; Chyr-Pwu Tzou; Jyh-Horng Chen, all of Taipei, Taiwan

[73] Assignee: Sampo Corporation, Taipei, Taiwan

[21] Appl. No.: 681,386

[22] Filed: Jul. 23, 1996

[51] Int. Cl.[6] .................................................. G11B 7/12
[52] U.S. Cl. ..................... 369/112; 369/44.14; 369/109; 369/118
[58] Field of Search ............................. 369/94, 112, 97, 369/110, 54, 58, 275.4, 283, 44.28, 44.11, 44.14, 109, 118

[56] References Cited

U.S. PATENT DOCUMENTS

| | | | |
|---|---|---|---|
| 5,408,453 | 4/1995 | Holtslag et al. | 369/94 |
| 5,487,060 | 1/1996 | Rosen et al. | 369/112 |
| 5,499,231 | 3/1996 | Fennema et al. | 369/112 |

*Primary Examiner*—Muhammad N. Edun
*Attorney, Agent, or Firm*—Morton J. Rosenberg; David I. Klein

[57] ABSTRACT

A method of using a single pick-up head to read and store data in discs of different thickness, especially for CD (compact disc) and DVD (digital versatile disc), the method including the step of adjusting the electronic aperture ring to change the numerical aperture, and change the distance between the disc and the object lens subject to type of the disc used.

20 Claims, 8 Drawing Sheets

METHOD OF USING A SINGLE PICK-UP HEAD TO READ AND STORE DATA ON DISCS OF DIFFERENT THICKNESSES AND STRUCTURE OF A PICK-UP HEAD APPARATUS THEREFOR

BACKGROUND OF THE INVENTION

The present invention relates to a method using a single pick-up head to read and store data in discs of different thickness, especially for CD (compact disc) and DVD (digital versatile disc), the including the step of adjusting the electronic aperture ring to change the numerical aperture, and change the distance between the disc and the object lens subject to type of the disc used. This invention relates also to the pick-up head for the application of the method.

Regular compact disc drivers are designed subject to the specifications of the laser discs. Regular compact discs include music compact discs and CD-ROMs. Since the establishment of the world DVD (digital versatile disc) standard, the pick-up head has to provide two focusing points to read CD and DVD, following is a comparison table between a CD and a DVD:

|     | THICKNESS mm | TRACK PITCH μm | WAVELENGTH nm | NA |
| --- | --- | --- | --- | --- |
| CD  | 1.2 | 1.6 | 780 | 0.4–0.45 |
| DVD | 0.6*2 | 0.74 | 635– –650 | 0.6 |

NA:Numerical Aperture.

CD drivers and DVD drivers use laser light of different wavelength to read data from CD and DVD respectively. Because the thickness of a CD is different from that of a DVD, a common pick-up head cannot be used to read both CD and DVD. Because of the requirement for compatibility, a DVD driver must be designed to read discs of different thickness. There are several methods which achieve this requirement. These methods include; 1) using two object lenses to read discs of different thickness; 2) using a HOE (holographic optical element) to provide two focusing points; and 3) using a LCD shutter. However, using two object lenses to read discs of different thickness greatly increases the weight of the pick-up head and its manufacturing cost, when a HOE is used, the light output of the laser diode will be splitted into several different orders, thereby causing the noise level to be relatively increased and the emission light power of laser diode has to increase too. Furthermore, HOE is difficult and expensive, to manufacture. If a LCD shutter is used, the polarization of the laser light source must be properly arranged relative to the LCD and polarizer. Therefore, this design is difficult to install. Furthermore, the LCD need continous power supply to maintain shutter effect.

SUMMARY OF THE INVENTION

The present invention has been accomplished under the circumstances in view. According to the present invention, the method of using a single pick-up head to read and store data in CD (compact disc) and DVD (digital versatile disc), includes the step of adjusting the electronic aperture ring to change the numerical aperture, and change the distance between the disc and the object lens subject to type of the disc used.

DETAILED DESCRIPTION OF THE PREFERRED EMBODIMENT

Figure 1:
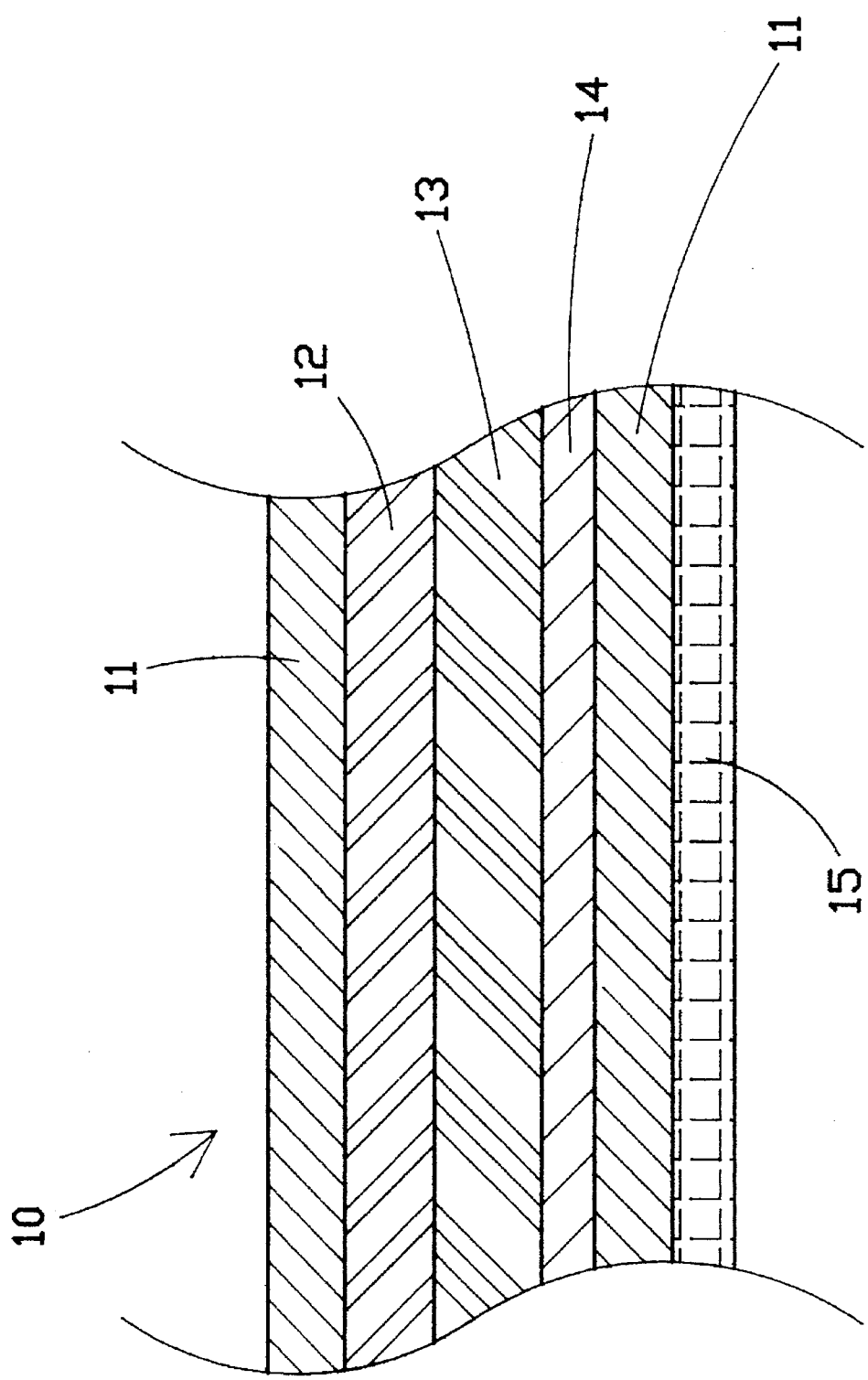
FIG. 1 is a sectional view of an electrochromic device according to the present invention.

There, are quite a lot of ways to achieve electrochromic effect. We just take an example here, referring to FIG. 1, the ECD (electrochromic device) 10 is composed of a glass substrate 15, two electrodes 11 covered on the glass substrate 15 at one side, an ion storage layer 12 and an electrochromic layer 14 separated by an electrolyte layer 13 and retained between the electrodes 11. When electric current is connected to the electrodes 11, ions are forced to dissipate from the ion storage layer 12 through the the electrolyte layer 13 to the electrochromic layer 14. The electrochromic layer 14 is made from electrochromic material which can be an organic or inorganic substance. In an embodiment of the present invention, the electrochromic layer 14 is made from tungsten trioxide, having the thickness of 6 μm. The light transmission of the electrochromic layer 14 drops from 86% to 11% when the charging rate is increased from 0 to 20 mC/Sq.cm. Because the ECD 10 has memory effect, it does not change its status when power supply is cut off after having been colored or bleached. When to bleach the color of the ECD 10, it can be easily achieved by reversing the current. Because only few seconds are needed to make a change, power supply can be disconnected immediately after a color change or bleach of the ECD 10. Therefore, power consumption is minimized, and the operation efficiency is greatly improved.

Figure 2:
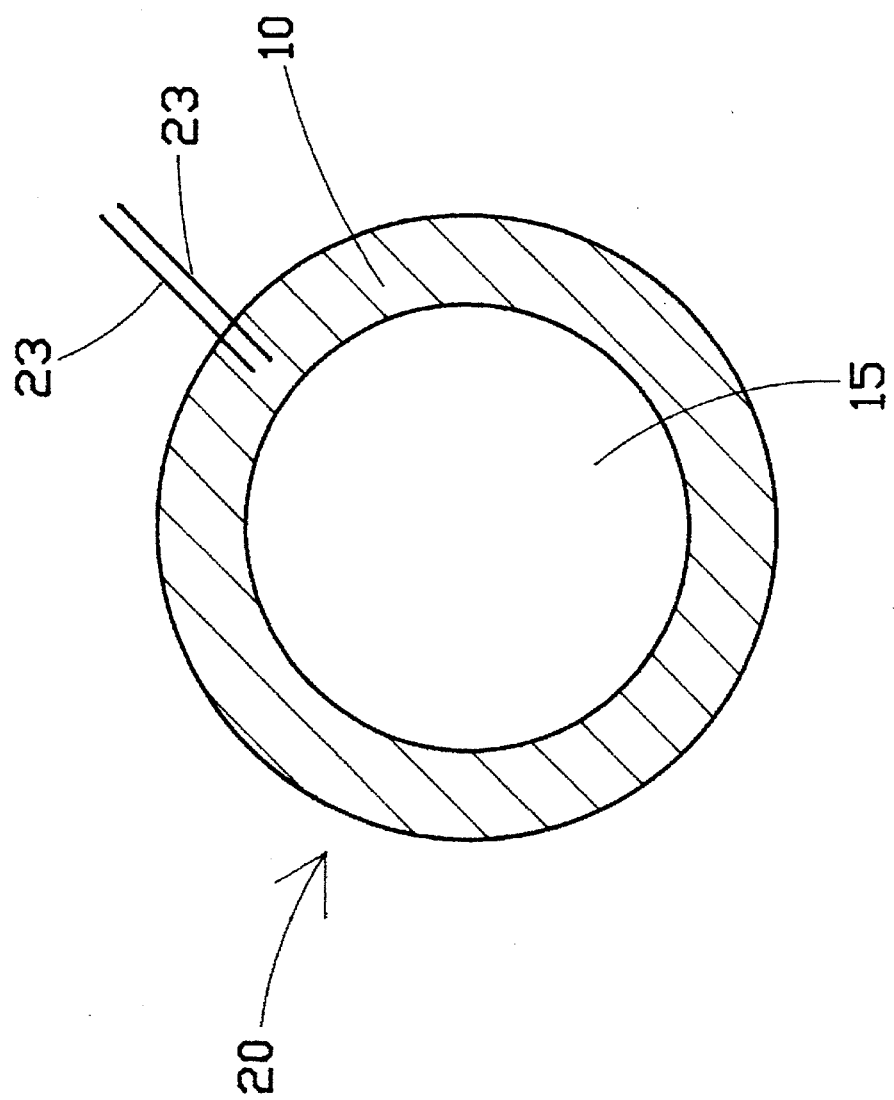
FIG. 2 is a front view of an electronic aperture ring according to the present invention.

Referring to FIG. 2, the electronic aperture ring 20 is composed of a glass substrate 15, an ECD 10 mounted around the periphery of the glass substrate 15, and electric power conductors 23 respectively connected to the electrodes of the ECD 10. The ECD 10 is made around the periphery of the glass substrate 15 by sputtering or CVD (chemical vapor deposition). The central part of electronic shutter can be with or without glass. In order to keep optical path constant for the light in the center and periphery, the optical thickness of the glass in the center part had better be the same with the optical thickness in the periphery.

Figure 3:
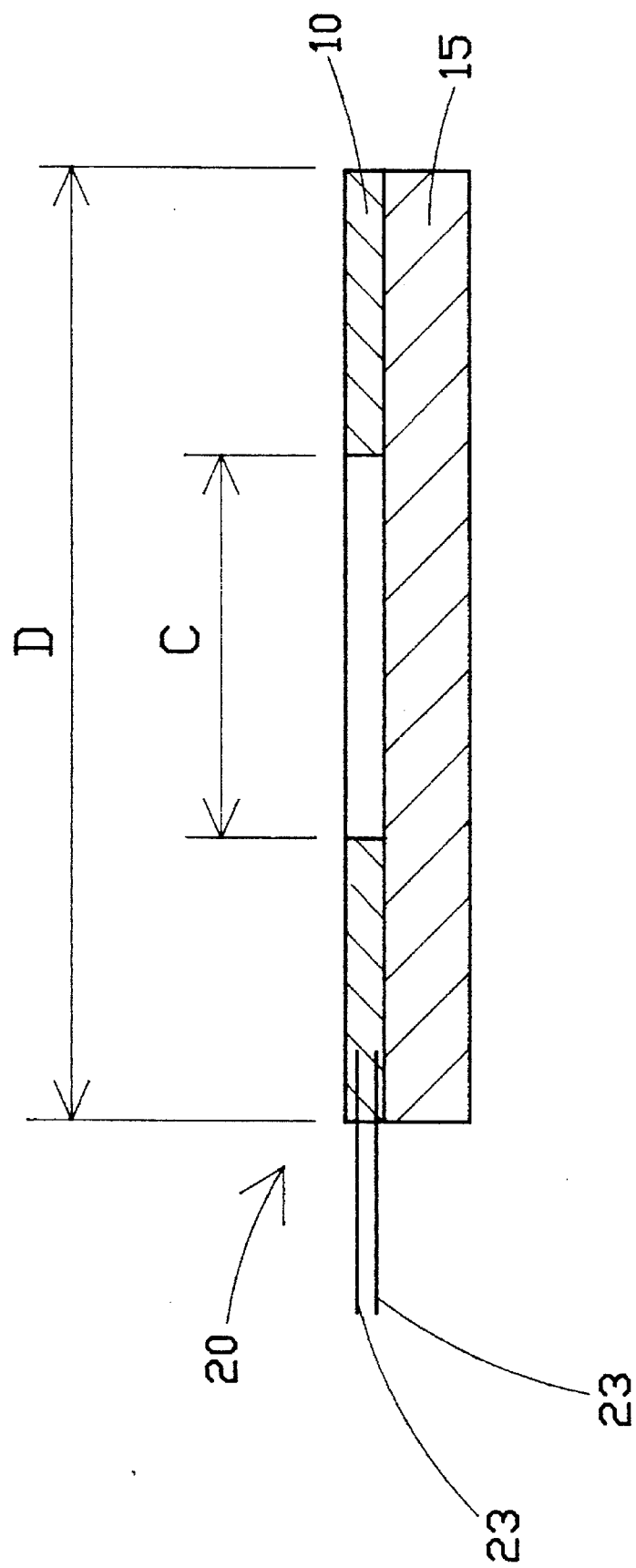
FIG. 3 is a sectional view of the electronic aperture ring shown in FIG. 2.

Referring to FIG. 3, the ECD 10 of the electronic aperture ring 20 is maintained in the transparent status when reading a DVD (digital versatile disc) or storing data on it. At this stage, the numerical aperture of the lens is 0.6. When a compact disc is used, an electric current is applied to the ECD 10, causing it to absorb laser light and then to reduce its light transmission to below 11%. Therefore, the diameter of the light beam is reduced from D to C. Because the aperture ring is reduced, the numerical aperture of the lens is reduced to 0.4. When the numerical aperture of the lens is reduced, power supply is cut off from the ECD 10. Because of the application of the ECD 10, power consumption minimized.

Figure 4:
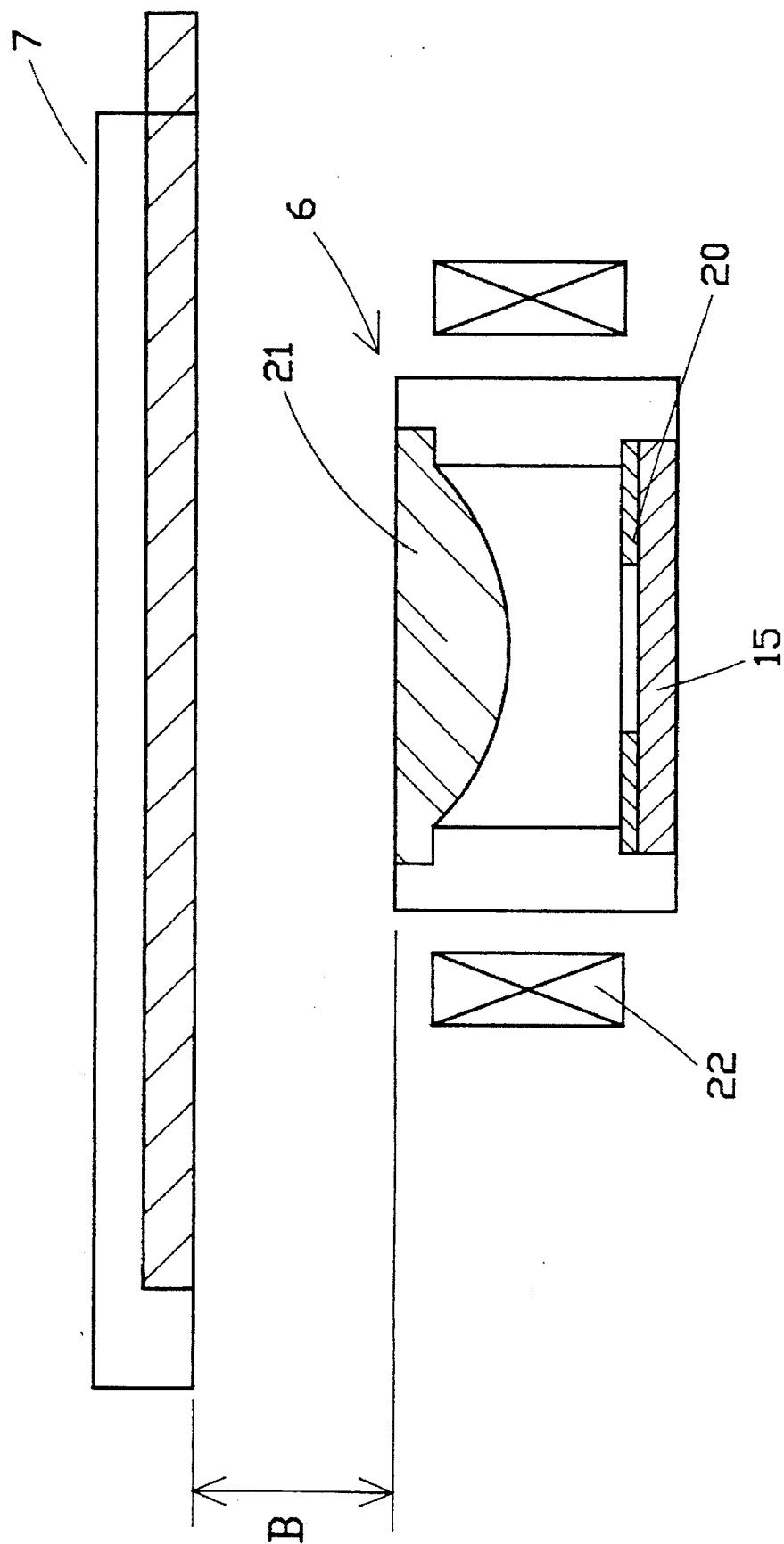
FIG. 4 shows the arrangement of a focusing mechanism according to the present invention.

Referring to FIG. 4, the focusing mechanism 6 is composed of an electronic aperture ring 20, an object lens 21, and actuator 22. Because the thickness of a compact disc is 1.2 mm, the thickness of a DVD is 0.6 mm and the thickness difference between a compact disc and a DVD is 0.6 mm, the distance between the object lens 21 and the disc 7 must be relatively shortened when reading a compact disc, i.e. the distance B must be relatively adjusted subject to the type of the disc 7. The adjustment of the object distance B can be achieved by changing the distance between the pick-up head and the turn table. The present invention achieves the adjustment of the object distance B by controlling the actuator 22 to change the distance between the focusing mechanism 6 and the disc 7. It is still practical to fix the pick-up head focusing mechanism and change the elevation of the turn table.

Figure 5:
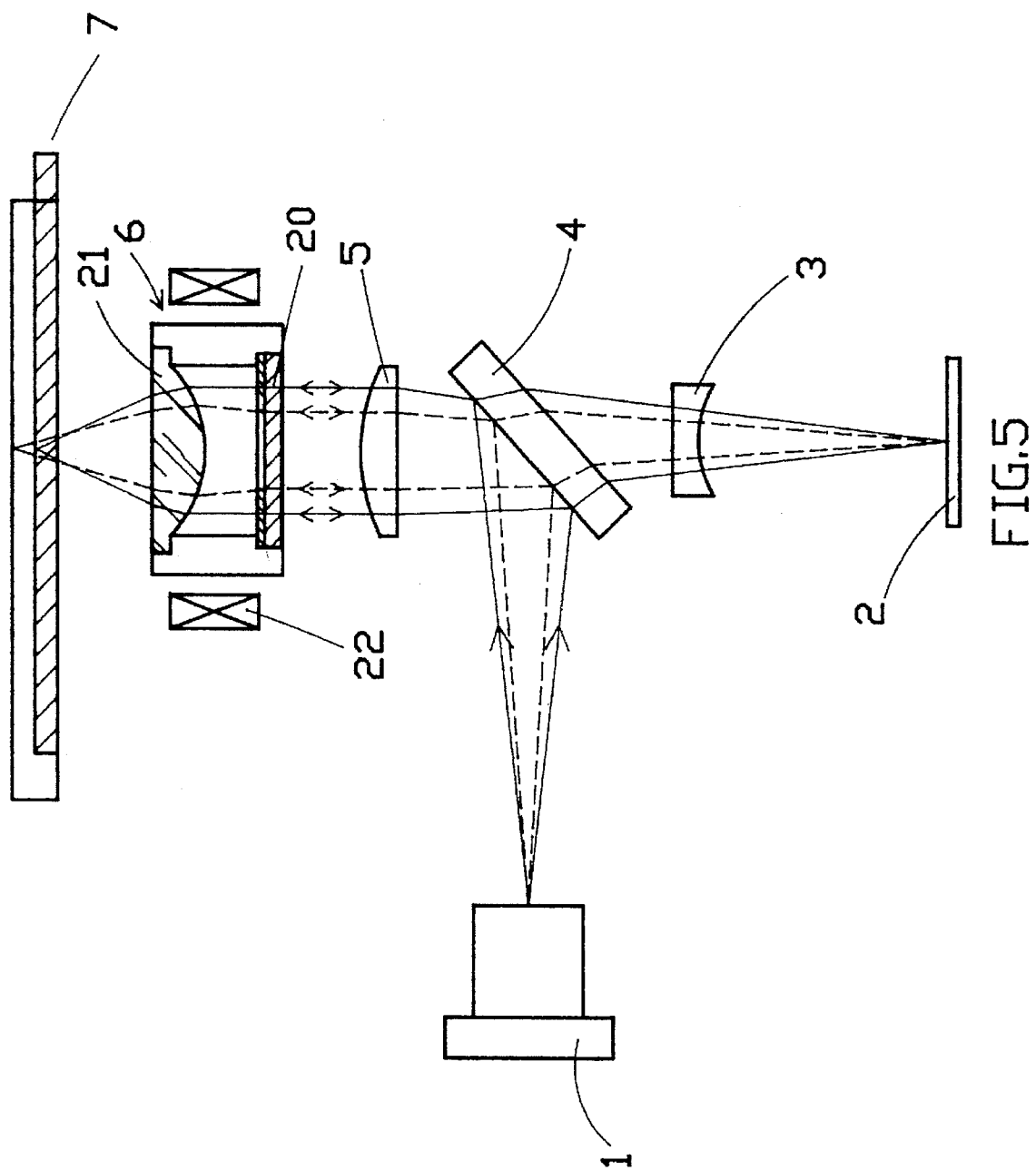
FIG. 5 shows the arrangement of a pick-up head according to a first embodiment of the present invention.

Referring to FIG. 5, a pick-up head in accordance with a first embodiment of the present invention is composed of a laser diode 1, a photodetector 2, a concave lens 3, a beam splitter 4, a collimator lens 5, and a focusing mechanism 6. The light of the laser diode 1 is partially reflected by the beam splitter 4 onto the collimator lens 5 to form parallel light, which is then focussed onto the surface of the disk 7 by the focusing mechanism 6. The reflected light from the disk 7 passes through the focusing mechanism 6, the collimator lens 5, beam splitter 4 and the concave lens 3, then to the photodetector 2. Focusing and tracking can be achieved by means of the employment of any of a variety of conventional methods such as astigmatism, 3-beam method, differential phase detection (heterodyne), or push-pull method, etc. If 3-beam method is employed, a grating must be used and put in between the laser diode 1 and the beam splitter 4.

Figure 6:
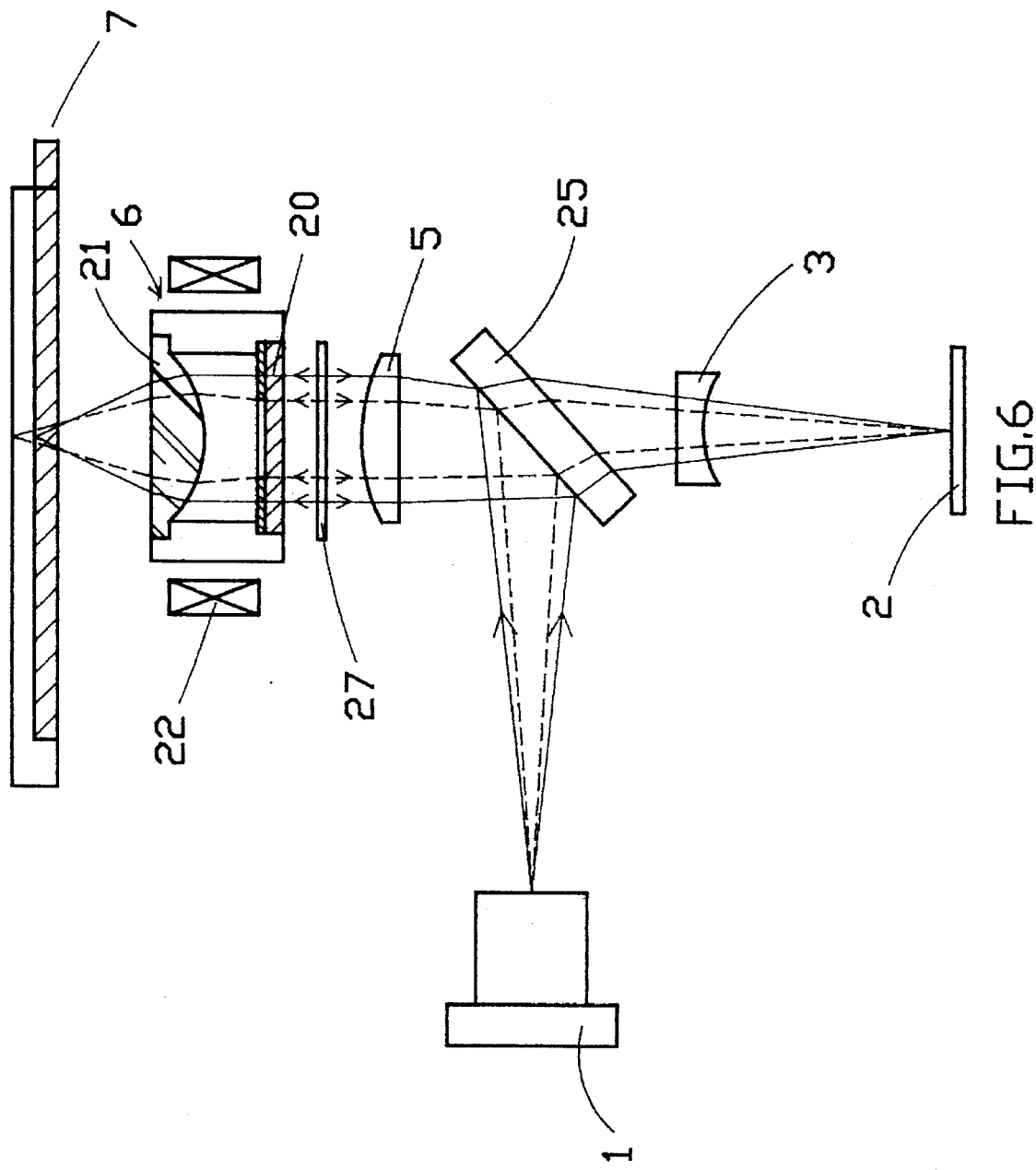
FIG. 6 shows the arrangement of a pick-up head according to a second embodiment of the present invention.

FIG. 6 shows a pick-up head according to a second embodiment of the present invention. According to this embodiment, the pick-up head is composed of a laser diode 1, a photodetector 2, a concave lens 3, a polarized beam splitter 25, a collimator lens 5, a ¼-λ retarder 27, and a focusing mechanism 6. The polarized beam splitter 25 reflects the laser beam wholly from the laser diode 1 onto the collimator lens 5, permitting it be sent through the ¼-λ retarder 27 to focusing mechanism 6 and then focused onto the disc 7 by the focusing mechanism 6. The reflected light beam from the disc 7 passes through the focusing mechanism 6 and the ¼-λ retarder 27. When passing through the focusing mechanism 6 end the ¼-λ retarder 27, the polarization of the reflected light beam is rotated 90° compared with the incident light and then the reflected light beam is sent through the polarized beam splitter 25 and the concave lens 3 to the photodetector 2. The use of the polarized beam splitter 25 and the ¼-λ retarder 27 enables the energy of the light beam to be fully utilized, and simultaneously reduces the noise level caused by the reflected light against the laser beam of the laser diode 1.

Figure 7:
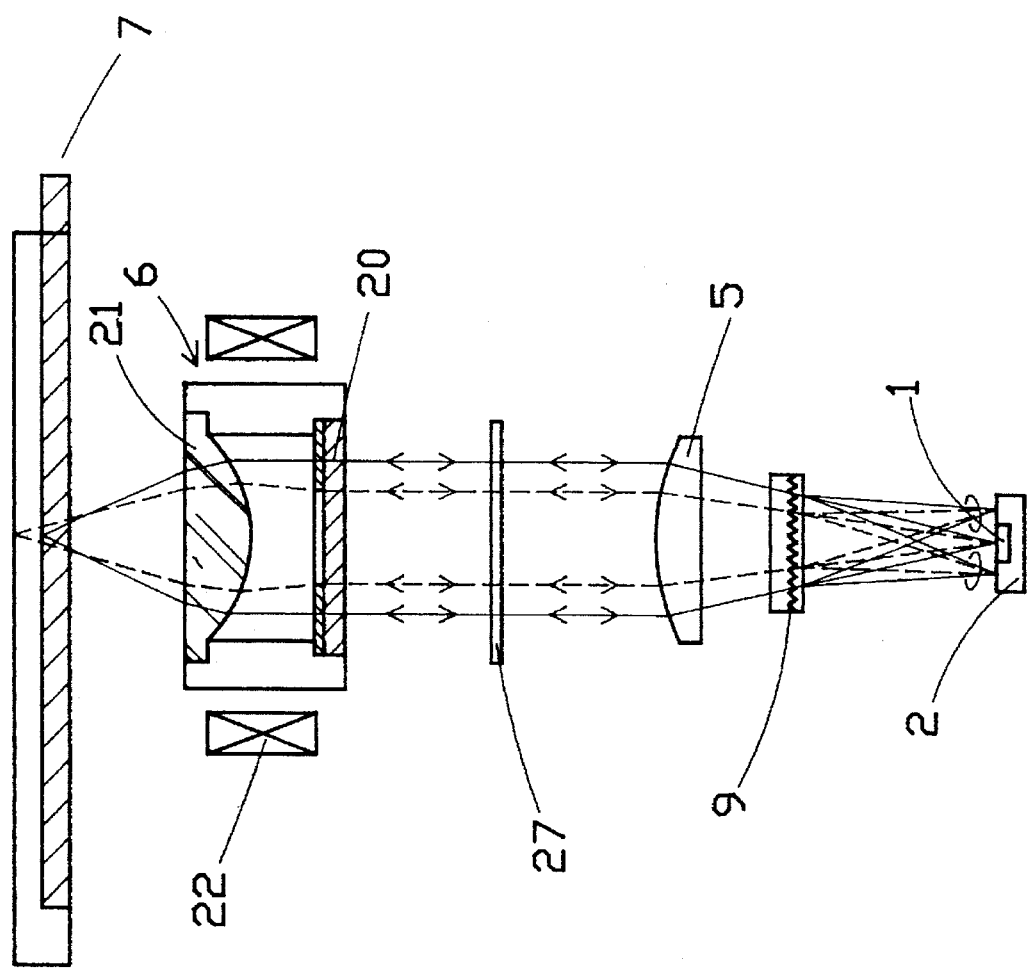
FIG. 7 shows the arrangement of a pick-up head according to a third embodiment of the present invention.

FIG. 7 shots a pick-up head according to a third embodiment of the present invention. According to this embodiment, the pick-up head is composed of a laser diode 1, a photodetector 2, a PHOE (polarized holographic optical element) 9, a collimator lens 5, a ¼-λ retarder 27, and a focusing mechanism 6. The laser beam of the laser diode 1 falls to the PHOE 9. The PHOE 9 is a flat plate made from a surface relief type birefringent crystal plate with a covering material having the same refractive index in a particular direction for example Y direction. When the polarization of the incident light beam is in the Y-axis direction, the light beam is sent through the PHOE 9 without changing its polarization direction, and then caused by the collimator lens 5 to change to parallel light beam. The parallel light beam is then sent through the ¼-λ retarder 27, and changed to a circular polarized light. The circular polarized light is then focused onto the disc 7 by the focusing mechanism 6. The reflected light passes from the disc 7 in the same path to the ¼-λ retarder 27. When passing through the ¼-λ retarder 27, the reflected light is changed to a linear polarized light, and its direction is turned from the Y-axis direction to the X-axis direction, and then, the reflected light is sent through the PHOE 9, and focused by the PHOE 9 onto the photodetector 2, which is disposed at one side of the laser diode 1. Because the energy of the laser beam is fully utilized, the performance of the pick-up is greatly improved, and less noise is produced during the operation of the pick-up head. Another advantage of this structure of pick-up head is its compact size.

Figure 8:
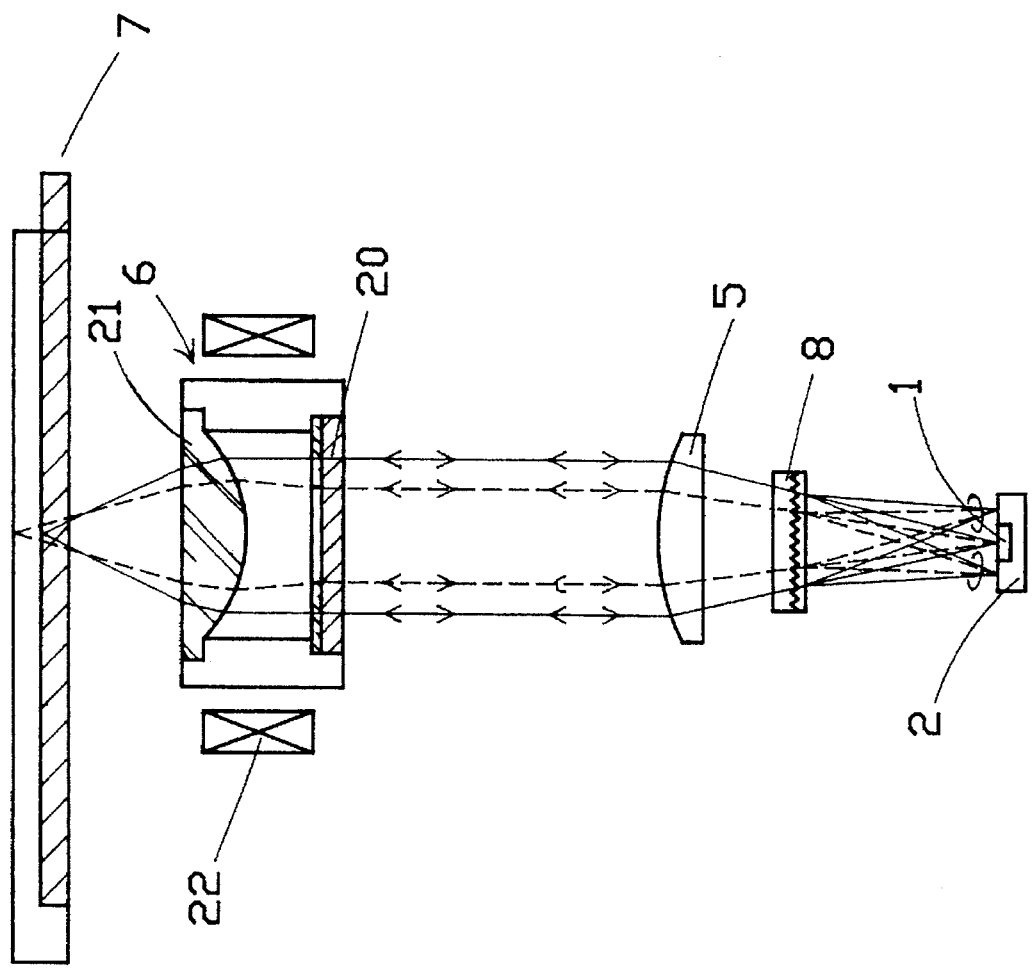
FIG. 8 shows the arrangement of a pick-up head according to a fourth embodiment of the present invention.

FIG. 8 shows a pick-up head according to a fourth embodiment of the present invention. According to this embodiment, the pick-up head is comprised of a laser diode 1, a photodetector 2, a HOE (holographic optical element) 8, a collimator lens 5, and a focusing mechanism 6. This embodiment is similar to the third embodiment shown in FIG. 7, but eliminates the installation of the ¼-λ retarder 27. When the laser beam of the laser diode 1 falls to the HOE 8, the zeroth order transmitted light is then collimated by the collimator lens 5 to change to parallel light beam. The parallel light beam is then focused onto the disc 7 by the focusing mechanism 6. The reflected light passes in the same path through the HOE 8, then the first order diffracted light is focused onto the photodetector 2. In comparision with the third embodiment shown in FIG. 7, the fourth embodiment shown in FIG. 8 is easy to manufacture and less expensive, however it produces a higher noise level and cannot fully utilizes the energy of the laser beam.

It is to be understood that the drawings are designed for purposes of illustration only, and are not intended as a definition of the limits and scope of the invention disclosed.

What the invention claimed is:

1. A method of electro-optically configuring a transducing head for selective operation with a first optical disc having a first structural format and at least a second optical disc having a second structural format different from said first structural format comprising the steps of:

(a) establishing an optical beam path incident upon a selected one of said first and second optical discs;

(b) forming focusing means by optically coupling together along said optical beam path an objective lens and an electronic aperture ring assembly, said electronic aperture ring assembly having an electrically adjustable numerical aperture parameter, said focusing means being disposed on said optical beam path a separation distance from said selected optical disc;

(c) adjusting said numerical aperture parameter of said electronic aperture ring assembly by applying an electrical signal to said electronic aperture ring assembly; and, (d) adjusting said separation distance between said focusing means and said selected optical disc in predetermined manner based upon the value of said electronic aperture ring assembly numerical aperture parameter and said optical format of said selected optical disc.

2. The method of electro-optically configuring a transducing head as recited in claim 1 wherein said step of forming focusing means includes forming in said electronic aperture ring assembly an annular electrochromic device coaxially aligned with said objective lens, said electrochromic device having an electrically adjustable light transmissivity parameter.

3. The method of electro-optically configuring a transducing head as recited in claim 2 wherein said electrical signal is applied to said electrochromic device of said electronic aperture ring assembly for selectively adjusting said light transmissivity parameter thereof.

4. The method of electro-optically configuring a transducing head as recited in claim 1 wherein said separation distance between said focusing means and said selected optical disc is adjusted by reversibly displacing said focusing means along said optical beam path relative to said selected optical disc.

5. The method of electro-optically configuring a transducing head as recited in claim 1 wherein said separation distance between said focusing means and said selected optical disc is adjusted by reversibly displacing said selected optical disc along said optical beam path relative to said focusing means.

6. An electro-optically configurable transducing head for selective operation with a first optical disc having a first structural format and at least a second optical disc having a second structural format different from said first structural format comprising:

(a) a light source adapted to generate an optical beam;

(b) photodetector means;

(c) optics means for optically coupling at least a portion of a selected one of said first and second optical discs with both said light source and said photodetector means, said optics means defining an optical beam path for said optical beam connecting said light source, said photodetector means, and said selected optical disc;

(d) focusing means disposed in said optical beam path a separation distance from said selected optical disc, said focusing means including an objective lens and an electronic aperture ring assembly, said electronic aperture ring assembly having an electrically adjustable numerical aperture parameter;

(e) control means coupled to said focusing means for applying an electrical signal to said electronic aperture ring assembly to adjust said numerical aperture parameter thereof; and, (f) means for adjusting said separation distance between said focusing means and said selected optical disc in predetermined manner based upon the value of said electronic aperture ring assembly numerical aperture parameter and said optical format of said selected optical disc.

7. The electro-optically configurable transducing head as recited in claim 6 wherein said optics means includes in said optical beam path beam splitter means.

8. The electro-optically configurable transducing head as recited in claim 7 wherein said optics means includes a collimator lens disposed in said optical beam path between said beam splitter means and said focusing means.

9. The electro-optically configurable transducing head as recited in claim 7 wherein said optics means includes image correction means disposed in said optical beam path between said beam splitter means and said photodetector means.

10. The electro-optically configurable transducing head as recited in claim 9 wherein said image correction means includes astigmatic aberration generating means.

11. The electro-optically configurable transducing head as recited in claim 10 wherein said astigmatic aberration generating means includes a concave lens.

12. The electro-optically configurable transducing head as recited in claim 9 wherein said image correction means includes a holographic optical element, said holographic optical element having a birefringent crystal portion.

13. The electro-optically configurable transducing head as recited in claim 7 wherein said optics means includes a diffraction grating element disposed in said optical beam path between said light source and said beam splitter means.

14. The electro-optically configurable transducing head as recited in claim 6 wherein said electronic aperture ring assembly of said focusing means includes an annular electrochromic device coaxially aligned with said objective lens, said electrochromic device having an electrically adjustable light transmissivity parameter.

15. The electro-optically configurable transducing head as recited in claim 14 wherein said control means applies said electrical signal to said electrochromic device of said electronic aperture ring assembly for selectively adjusting said light transmissivity parameter thereof.

16. The electro-optically configurable transducing head as recited in claim 15 wherein said electrochromic device includes a plurality of intermediate layers sandwiched between a pair of electrode layers electrically coupled to said control means, said intermediate layers including:

(a) an electrochromic layer;

(b) an electrolyte layer adjacent said electrochromic layer; and, (c) an ion storage layer adjacent said electrolyte layer, said ion storage layer being adapted to release a plurality of ions for migration through said electrolyte layer to said electrochromic layer responsive to the application of said electrical signal to said electrode layers.

17. The electro-optically configurable transducing head as recited in claim 6 wherein said optics means includes in said optical beam path a holographic optical element, said holographic optical element including a birefringent crystal portion.

18. The electro-optically configurable transducing head as recited in claim 17 wherein said holographic optical element is polarized.

19. The electro-optically configurable transducing head as recited in claim 18 wherein said optics means includes a quarter wave retarder plate disposed in said optical beam path between said polarized holographic optical element and said focusing means.

20. The electro-optically configurable transducing head as recited in claim 6 wherein said optics means includes polarized beam splitter means and a quarter wave retarder plate, said quarter wave retarder plate being disposed in said optical beam path between said polarized beam splitter means and said focusing means.

* * * * *